United States Patent [19]
Narwid et al.

[11] 3,856,780
[45] Dec. 24, 1974

[54] SYNTHESIS OF 25-HYDROXYCHOLESTEROL AND DERIVATIVES THEREOF

[76] Inventors: Thomas Albert Narwid, 7 Brooklawn Dr., Pompton Plains, N.J. 07444; Milan Radoje Uskokovic, 253 Highland Ave., Upper Montclair, N.J. 07043

[22] Filed: Oct. 23, 1973

[21] Appl. No.: 408,788

Related U.S. Application Data

[63] Continuation-in-part of Ser. No. 371,091, June 18, 1973.

[52] U.S. Cl... 260/239.55 R, 260/397.1, 260/397.4, 260/397.5

[51] Int. Cl.................... C07c 173/00, C07c 169/48
[58] Field of Search..... 260/239.55 R, 397.2, 397.1, 260/397.5

Primary Examiner—Elbert L. Roberts
Attorney, Agent, or Firm—Samuel L. Welt; Jon S. Saxe; George M. Gould

[57] ABSTRACT

25-Hydroxycholesterol, an intermediate in the preparation of biologically important metabolites of Vitamin $D_3$ is synthesized in a multi-step process from pregnenolone.

31 Claims, No Drawings

SYNTHESIS OF 25-HYDROXYCHOLESTEROL AND DERIVATIVES THEREOF

RELATED APPLICATIONS

This application is a continuation-in-part of pending U.S. Pat. application Ser. No. 371,091, filed June 18, 1973.

BRIEF DESCRIPTION OF THE INVENTION

It has recently been discovered that a metabolite of Vitamin $D_3$, 25-hydroxycholecalciferol, is a significantly better anti-rachitic agent than Vitamin $D_3$ itself. This compound has been prepared from 25-hydroxycholesteryl-3-acetate which in turn was prepared from $3\beta$-hydroxy-5-cholenic acid. since the latter compound is no longer a readily available starting material for the preparation of 25-hydroxycholesterol and its esters, it would be desirable to find a route to such compounds utilizing an inexpensive and readily available starting material.

The present invention relates to a novel process for the preparation of 25-hydroxycholesterol and its 3-derivatives, particularly esters, starting from the readily available and inexpensive starting material, pregnenolone ($3\beta$-hydroxy-5-pregnen-20-one), which is commercially prepared by degradation of the natural product diosgenin and can also be prepared from the natural product stigmasterol.

The synthesis involves, as key steps, the conversion of the $17\beta$-acetyl side chain of pregnenolone into the requisite 25-hydroxycholesterol side chain by means of homologations of 2 carbons, 3 carbons and 1 carbon, respectively, and the hydrogenation of a $\Delta^{20(22)}$ double bond.

As used throughout the specification and the appended claims, the term "alkyl group" refers to a monovalent substituent consisting solely of carbon and hydrogen of from 1 to 20 carbon atoms which may be straight or branched-chain. Examples of alkyl groups are methyl, ethyl, n-propyl, i-propyl, tert-butyl, hexyl, octyl, and so forth. The term "alkylene group" refers to a divalent substituent consisting solely of carbon and hydrogen of from 1 to 20 carbon atoms which may be straight or branched-chain and whose free valences are attached to two distinct groups. Examples of alkylene groups are methylene, ethylene, propylene and so forth. The term "alkoxy group" refers to a monovalent substituent which consists of an alkyl group linked through an ether oxygen having its free valence bond from the ether oxygen. Examples of alkoxy groups are methoxy, ethoxy, isopropoxy, tert-butoxy, and so forth. The term "tertiary alkoxy group" refers to an alkoxy group in which the ether oxygen is linked to a carbon which bears 3 carbon substituents. Examples of tertiary alkoxy groups are tert-butoxy, tert-amyloxy, and so forth. The term "phenyl alkoxy" refers to an alkoxy group which is substituted by a phenyl ring. Examples of phenyl alkoxy groups are benzyloxy, 2-phenyl-ethoxy, 4-phenylbutoxy, and so forth. The term "alkanoyloxy group" refers to the residue of an alkylcarboxylic acid formed by removal of the hydrogen from the hydroxyl portion of the carboxyl group. Examples of alkanoyloxy groups are formyloxy, acetoxy, butyryloxy, hexanoyloxy, and so forth. The term "substituted," as applied to "phenyl," refers to phenyl which is substituted with one or more of the following groups: alkyl, halogen (i.e., fluorine, chlorine, bromine or iodine), nitro, cyano, trifluoromethyl, and so forth. The term "lower," as applied to any of the aforementioned groups, refers to those groups having from 1 to 8 carbon atoms.

In the formulae presented herein, the various substituents are illustrated as joined to the steroid nucleus by one of three notations: a solid line (—) indicating a substituent which is in the $\beta$-orientation (i.e., above the plane of the molecule), a dotted line (------) indicating a substituent which is in the $\alpha$-orientation (i.e., below the plane of the molecule), or a wavy line ( ) indicating a substituent which may in the $\alpha$- or $\beta$-orientation. The formulae have all been drawn to show the compounds in their absolute stereochemical configuration. Inasmuch as the starting material, pregnenolone, and the final product, 25-hydroxycholesterol, are derived from naturally occurring materials, they exist in the single absolute configuration depicted herein. However, the process of the present invention is intended to apply as well to the synthesis of steroids of the racemic series. Thus, one may begin the synthesis utilizing racemic pregnenolone, or a derivative thereof, to prepare racemic 25-hydroxycholesterol. Optically active 25-hydroxycholesterol can be prepared by optical resolution of racemic 25-hydroxycholesterol, or of an intermediate utilized in the preparation thereof as hereinafter described, by standard resolution techniques well known in the art, for example, involving fractional crystallization of diastereomeric salts of the particular compound that is being resolved. The starting material for the present synthesis is pregnenolone or a derivative of pregnenolone such as a 3ether or 3-ester; or an i-steroid (6-substituted-$3\alpha,5$-cyclo-$5\alpha$-steroid) derived from pregnenolone having in the 6-position a hydroxy group, or an ether or ester thereof. The starting material is represented by formula I

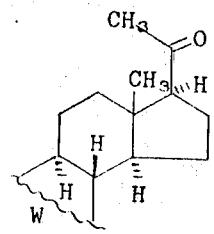

I wherein W is one of the partial formulas

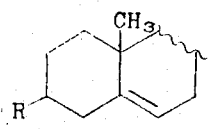 or 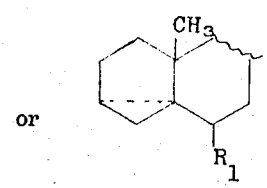

and R is hydroxy, tertiary lower alkoxy, benzyloxy, diphenylmethoxy, trityloxy, lower alkanoyloxy, benzoyloxy, acetoacetoxy, or a group of the formula

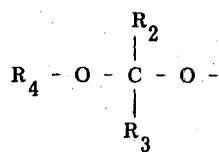

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy or acetoacetoxy.

Among the R groups which may be present in the starting compound of formula I which have not been specifically mentioned above are acetoxy, propionyloxy, tert-butoxy, tetrahydropyran-2-yloxy, tetrahydrofuran-2-yloxy, methoxy-methoxy, 2-(2-methoxy)-isopropoxy and so forth. Among the $R_1$ groups which may be present in the starting compound of formula I which have not been specifically mentioned above are methoxy, ethoxy, benzyloxy, and acetoxy.

As starting materials of formula I for the present sequence, there may be mentioned, among others, pregnenolone, pregnenolone-3-acetate, pregnenolone-3-tetrahydropyranyl ether, i-pregnenolone-methyl ether ($6\alpha$-methoxy-$3\alpha$,5-cyclo-$5\alpha$-pregnan-20-one) and so forth.

The reaction sequences of the present invention are the same whether one utilizes a pregnenolone derivative wherein W represents the first depicted partial formula, or whether it is the corresponding i-steroid wherein W is the second depicted partial formula. The only difference is that, in the case of the i-steroid, such moiety must first be formed from pregnenolone of a derivative thereof and must, at the end of the sequence, be converted back to a steroid having a 3-hydroxy-$\Delta^5$ system or a derivative thereof. The i-steroid moiety serves to conveniently protect the $\Delta^5$ double bond. However, it has been found that for the present invention, the $\Delta^5$ double bond need not be protected, even during a hydrogenation step involving the $\Delta^{20(22)}$ double bond. Thus, the preferred reaction sequence involves the transformation of steroids wherein W is the first depicted partial formula, i.e., one having a 3-substituent and a $\Delta^5$ double bond.

Pregnenolone and its 3-esters, such as the acetate, are conveniently available starting materials, which are commercially prepared from the naturally occurring material diosgenin and can also be prepared from the natural product stigmasterol. Ethers and more complicated esters of pregnenolone are prepared by etherifying or esterifying pregnenolone in the normal manner, according to methods known per se.

Pregnenolone is conveniently transformed into the corresponding i-steroid of formula I wherein W is the second depicted partial formula, by a two-step reaction sequence well known in the art. Thus, the transformation is conveniently effected by first converting pregnenolone to a $3\beta$-sulfonyloxy derivative such as a tosylate or mesylate. This is accomplished by reaction pregnenolone with the corresponding sulfonyl halide in the presence of an organic base such as pyridine.

This sulfonyloxy derivative is subsequently converted to the i-steroid by treatment with base in an appropriate solvent, again by methods well known in the steroid art. For example, to prepare the i-steroid of formula I wherein $R_1$ is methoxy, one would employ methanol as a solvent. As suitable bases, there may be mentioned organic amine bases such as pyridine or triethylamine. If one wished to prepare i-pregnenolone itself, that is, where $R_1$ is hydroxy, one would use an aqueous medium. To prepare an i-steroid of formula I wherein $R_1$ is an ester, for example, acetoxy, one would use an alkanoic acid such as acetic acid as the solvent. Suitable bases in this case would include alkali metal salts of the acid employed, e.g., sodium acetate.

In the next step, the compound of formula I is reacted with vinyl organometallic reagent to afford the vinyl carbinol of formula II

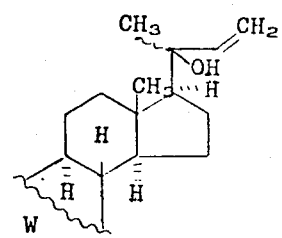

wherein W is as above. Suitable vinyl organometallic reagents include vinyl Grignard reagents such as vinyl magnesium chloride or vinyl magnesium bromide; and vinyl lithium. The reaction is suitably conducted in an inert organic solvent, most preferably an ether such as diethyl ether or tetrahydrofuran. The quantity of vinyl organometallic reagent utilized is at least one equivalent and it is preferred to utilize between about 2 and about 5 equivalents. In the case where pregnenolone or i-pregnenolene is utilized, i.e., where there is a free hydroxy group in the molecule, it is important to use a large excess of vinyl organometallic reagent to insure substantial addition to the 20-keto group.

It is also advisable to use a substantial excess of vinyl organometallic reagent when there is a 3- or 6-ester group present, since partial or complete cleavage of the group may occur to produce the corresponding alcohol. Such alcohol may be carried through the reaction sequence as is, or may be re-esterfied by conventional methods, if desired.

It has been found that especially favorable results can be achieved if the vinylation reaction is carried out in the presence of from about 1 to about 10 equivalents of hexamethylphosphorictriamide. The presence of this reagent in the solvent medium makes the vinyl organometallic reagent less basic and more nucleophilic, thus allowing for greater addition to the 20-keto group rather than reaction with a free hydroxy group or enolization of the 20-keto group.

The vinylation reaction is suitably conducted at a temperature between about $-20°$ and about $+100°C$. Most conveniently, the reaction is carried out at a temperature between about $+40°$ and about $+80°C$., suitably at the boiling point of the reaction medium.

It has been found that compounds of formula I which have an ester group in the 3- or 6- position can be vinylated under special conditions to avoid attack on the ester group and thus eliminate the necessity to re-esterify the product of formula II.

The conditions which lead to the surprising result are low temperature and a solvent medium comprising a halogenated hydrocarbon. The low temperature is suitably between about $-100°$ and $0°C$, preferably between about $-50°$ and $-78°C$, most preferably about $-70°C$. Suitable halogenated hydrocarbon solvents include, for example, dichloromethane, chloroform, carbon tetrachloride, 1,1-dichloroethane, 1,2-dichloroethane, tetrachloroethylene, and so forth. Dichloromethane is especially preferred. By conducting the vinylation reaction in the above-mentioned fashion, not only is the ester group retained, but the reaction proceeds in a homogenous mixture and relatively small amounts of solvent are employed. Additionally, smaller quantities of vinyl organometallic agent, as compared with the above procedure can be employed, for example, for about 1.0 to about 3 moles per mole of compound I, most preferably about 2.0 to about 2.5 moles.

The product of the vinylation reaction, the vinyl carbinol of formula II, can exist in two isomeric forms: A20(S) and a 20(R) form. Normally, a mixture of both isomers is obtained during the vinylation reaction, with the 20(S) isomer being predominant. The mixture obtained can either be purified, for example, by recrystallization, to afford the pure isomer having the 20(S) configuration or, preferably, the mixture can be carried through to the next stage of the synthesis without purification since the asymmetry at the 20-position is destroyed during the next reaction.

In the next step, the vinyl carbinol of formula II is homologated by three carbon atoms to afford the $\Delta^{20(22)}$-25-one of formula III

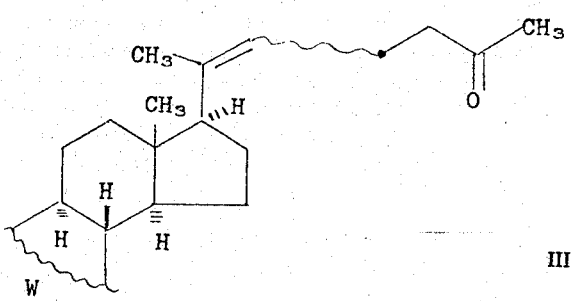

III wherein W is as above. This homologation reaction is carried out by treatment of the compound of formula II with a reagent selected from the group consisting of diketene, lower alkyl acetoacetates such as ethyl acetoacetate, and isopropenyl lower alkyl ethers such as isopropenyl methyl ether. Preferred reagents for this reaction are diketene and ethyl acetoacetate. Diketene is an especially preferred reagent.

When diketene is used as a reactant, it is preferred to utilize an excess of this reagent, for example, approximately two equivalents of diketene. Also, when diketene is used as a reactant, it is preferred to utilize a basic catalyst, for example, an organic amine such as pyridine, s-collidine, quinoline and the like, or an aluminum tris(alkoxide) such as aluminum isopropoxide. The quantity of basic catalyst employed can vary from about 0 to about 0.5 equivalents.

When utilizing an acetoacetate such as ethyl acetoacetate as a reactant, it is preferred to utilize a small molar excess, for example, from about a 5 to about 30 mole % excess of reagent.

The 3 carbon homologation reaction is suitably carried out at an elevated temperature between about 150° and 250°C. An especially preferred temperature range is from about 175° to about 225°C.

As suitable reaction solvents, there may be mentioned inert organic solvents such as high boiling hydrocarbons, for example, decalin, naphthalene, tetralin, cumene, and so forth; and high boiling ethers such as diglyme, triglyme, and the like.

When using diketone as a reactant, a particularly preferred solvent is decalin. When an ester of acetoacetic acid is utilized as a reactant, it is preferred not to utilize any additional solvents although the above mentioned solvents could be employed, and the reaction is preferably run neat in the mixture of acetoacetic ester and compound of formula II.

During the reaction, a free hydroxyl group in the 3- or 6-position may be converted to its acetoacetate ester by reaction with excess reagent. Such an ester can either be saponified using normal techniques, or can be carried through until later stages of the reaction sequence.

The reaction product of formula III having the $\Delta^{20(22)}$ double bond can exist in two forms: A cis and a trans form. Normally, during the reaction, a mixture of both forms is produced, usually with a slight predominance of the trans-isomer. The ratio of isomers is relatively independent of the particular reagent utilized to effect the reaction.

The cis and trans isomers can be separated, if desired, by means known per se, such as fractional crystallization or, most preferably, by chromatography such as column or thick-layer chromatography.

It is preferred, however, not to separate the mixture of isomers, but to carry them through to the next stage of the reaction since, as will be mentioned later, hydrogenation of either the cis or trans isomer, or mixtures thereof, affords essentially the same product.

In one alternative reaction sequence, the compound of formula III is treated with a methyl organometallic reagent to afford the compound of formula IV

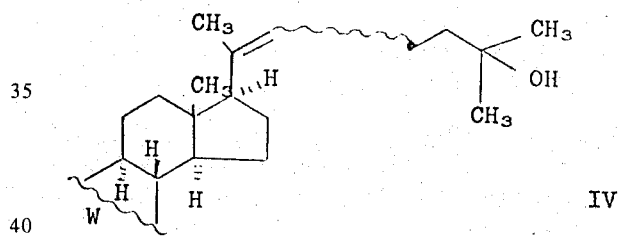

IV wherein W is as above, which contains all of the carbons and the hydroxyl group of the 25-hydroxycholesterol side chain.

Suitable methyl organometallic reagents for this purpose include methyl Grignard reagents such as methyl magnesium chloride, methyl magnesium bromide, methyl magnesium iodide; and methyl lithium. A particularly preferred reagent for this purpose is a methyl Grignard reagent such as methyl magnesium iodide. It is preferred to utilize an excess of methyl organometallic reagent, for example, from about a 2- to about a 10-fold molar excess. The use of a large molar excess of reagent is especially preferred when there is a free hydroxy group in the 3- or 6-position, or when there is an ester group in these positions. In the latter case, there may be partial or complete cleavage of a 3- or 6-ester group to afford a hydroxy group, thus consuming some of the organometallic reagent. As mentioned earlier for the vinyl organometallic addition, hydroxy groups produced by cleavage of an ester group can be re-esterified, if desired, by conventional techniques.

Suitable solvents for addition of the methyl organometallic reagent include ethers such as diethyl ether, tetrahydrofuran, dioxane, and the like.

The reaction is conveniently performed at a temperature between about −20 and +50°C. A particularly preferred temperature range is between about +10 and +30°C.

In the next reaction step, the compound of formula IV is catalytically hydrogenated to afford the compound of formula V

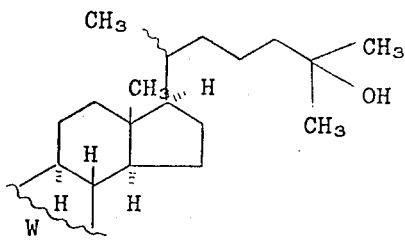

V wherein W is as above. It has been found that, surprisingly, the $\Delta^{20(22)}$ double bond can be hydrogenated without substantial hydrogenation of a $\Delta^5$ double bond. Thus, in a preferred route, compounds having a $\Delta^5$ double bond can be carried through the entire reaction sequence without need for protection.

The hydrogenation reaction is carried out in the presence of a metal hydrogenation catalyst. Suitable metal hydrogenation catalysts include, for example, the noble metals such as platinum, palladium and rhodium; and nickel. The catalysts employed are normally utilized in a finely divided state and may be either unsupported or present on a suitable inert catalyst support. As catalyst supports which may be utilized for the present reaction, there can be mentioned, among others, charcoal, asbestos, diatomaceous earth, barium carbonate, calcium carbonate, strontium carbonate, alumina, and so forth.

The quantity of catalyst which may be employed is not narrowly critical and the amount of catalyst (including support) can vary from about 1 to about 50 weight % relative to the compound being hydrogenated. It is generally preferred to utilize between about 5 and about 15 weight % of the catalyst. Furthermore, the metal catalyst may be present on its support in a range from about 2 to about 20 weight %.

Hydrogenation of the compound of formula IV to afford a compound of formula V produces a mixture of two stereoisomers: a 20(R) and a 20(S) isomer. It has been found that the ratio of isomers produced from the hydrogenation is relatively independent of the hydrogenation conditions and the catalyst and the product usually contains a slight predominance of the 20(R) isomer.

A particularly preferred hydrogenation catalyst for the present reaction is unsupported platinum (prepared by in situ reduction of platinum oxide, Adams catalyst).

As solvents for the hydrogenation reaction, there may be mentioned, among others, alcohols such as methanol or ethanol; ethers such as diethyl ether, tetrahydrofuran and dioxan; and esters such as ethyl acetate. A particularly preferred solvent for the hydrogenation reaction is an alcohol such as ethanol.

The conditions of temperature and pressure for the hydrogenation reaction are not narrowly critical. One conveniently carries oout the hydrogenation reaction at about, or slightly above, atmospheric pressure, although the reaction could be carried out at a substantially higher pressure. The temperature may vary from about 0°C to elevated temperatures of about 100°C, depending upon the solvent medium and the pressure employed. For convenience, it is preferred to carry out the present hydrogenation reaction at about room temperature.

In an alternative reaction sequence, the addition of the organometallic reagent and the hydrogenation reactions are reversed. Thus, in such a sequence, the compound of formula III is first converted by hydrogenation to a compound of formula VI

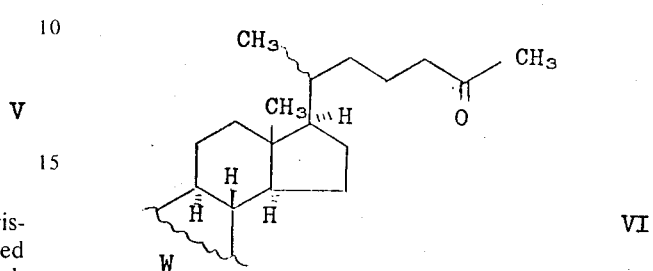

VI wherein W is as above, by hydrogenation of the $\Delta^{20(22)}$ double bond. This hydrogenation reaction is carried out in an identical fashion to that described above for the conversion of the compound of formula IV to that of V. Again, as for the conversion of compound IV to compound V, there is produced a mixture of 20(R) and 20(S) isomers which is relatively independent of reaction conditions or catalyst.

In the next step of this alternative reaction sequence, the compound of formula VI is converted to a compound of formula V by reaction with a methyl organometallic reagent. Again, this reaction is carried out in an identical fashion to that described above for the conversion of the compound of formula III to that of formula IV.

Compounds of the general type of formula Va

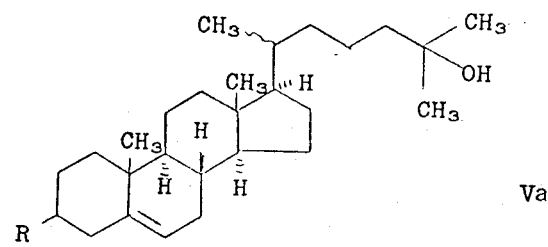

Va wherein R is as above, may be prepared from those of type formula Vb

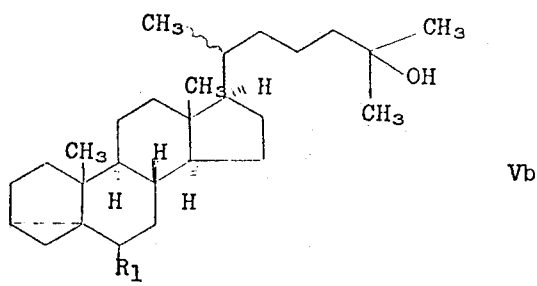

Vb wherein $R_1$ is as above, by means of retro-i-rearrangement. Thus, 25-hydroxycholesterol, and its 3-ether and esters, as well as the 20(S) isomers thereof may be prepared in this fashion.

The retro-i-rearrangement is carried out by treating the compound of formula Vb with a strong acid in an appropriate solvent. Suitable strong acids for this purpose include mineral acids such as hydrochloric acid and sulfuric acid; and organic sulfonic acids such as p-toluenesulfonic acid.

The solvent employed depends upon the nature of the R-group desired in the final product. Thus, if one desires to prepare, for example, 25-hydroxycholesterol (R is hydroxy), one would carry out the reaction in an aqueous solvent medium. The aqueous solvent medium may contain water miscible organic solvents such as dioxane, acetone and the like, to solubilize the reactants.

If one desires to prepare 25-hydroxycholesteryl-3-acetate, one would carry out the reaction in a solvent medium comprising acetic acid, most preferably, neat glacial acetic acid. In this case, no additional acidic catalyst is necessary since the alkanoic acid itself will serve as acid catalyst.

The retro-i-rearrangement is suitably conducted at an elevated temperature from about 40°to about 120°C, most preferably, from about 60°to about 100°C.

The compounds of formula Vb may be separated into their 20-isomers. This separation may be effected by a fractional crystallization, or by chromatographic means such as column or thick-layer chromatography. Where compounds of formula Vb have been prepared, it is desired to separate the 20(R) and 20(S) isomers prior to retro-i-rearrangement. Likewise, compounds of formula Va may be separated into their 20(R) and 20(S) isomers. Thus, in such a manner, there may be prepared in pure form the 20(R) isomer of formula Va-1

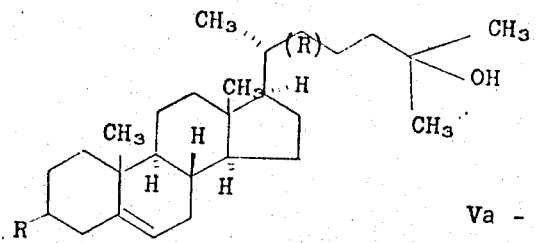

Va - 1 wherein R is as above. Compounds of formula Va-1 have the correct stereochemical configuration at the 20-position, i.e., the configuration of the naturally occurring side chain.

There may also be obtained the unnatural 20(S) isomer of formula Va-2

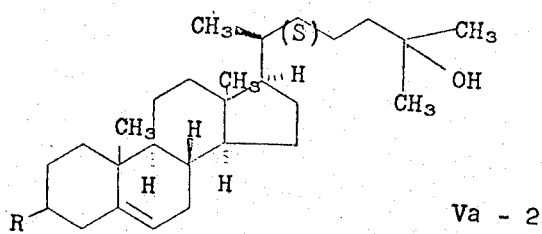

Va - 2 wherein R is as above.

As mentioned above, compounds of formula Va-1, particularly 25-hydroxycholesterol and its esters, such as the 3-acetate, are useful intermediates for the preparation of biologically active metabolites of Vitamin $D_3$.

The compounds having the unnatural 20(S) configuration of formula Va-2 are useful intermediates for the preparation of similar compounds related to the Vitamin $D_3$ metabolites, but having the unnatural (S) configuration at the 20-position.

Compounds of formula Va-2 are enzyme inhibitors. For example, they inhibit the oxidation of cholesterol to pregnenolene, which is a predursor of progesterone, the female sex hormone. They thus can be used to control hormone balance in the body, for example, as contraceptive and abortifacient agents.

Other variations upon the above reaction sequences can be mentioned. For example, the retro-i-rearrangement may be performed prior to the final stage of the reaction sequence upon the compounds of formula VI prior to their reaction with the methyl organometallic reagent. Still further variations upon the basic reaction sequences outlined above will become apparent to those skilled in the art from the aforesaid description, as well as from the following specific examples.

EXAMPLE 1

Pregn-5-en-3β-ol-20-one Tosylate

To a suspension of pregn-5-en-3β-ol-20-one (50.0 g, 0.158 mol) in 500 ml of dry pyridine under a nitrogen atmosphere was added in one portion with rapid stirring, p-toluenesulfonyl chloride (90.0 g, 0.472 mol). Stirring was continued at room temperature for 27 hr and the reaction mixture poured slowly over a period of 15–20 minutes into a vigorously stirred solution of 800 ml of saturated aqueous sodium bicarbonate. The white precipitate was filtered and washed with water (5 liters) until there was no odor of pyridine remaining. The product was dried under vacuum at 40°C for 16 hr to give 73.4 g of pregn-5-en-3β-ol-20-one tosylate, m.p. 130°–138°C.

The analytical sample was obtained after several recrystallizatons from dichloromethane-hexane, m.p. 132-134°; $[\alpha]D^{25}$ +7.68°(CHCl$_3$, c 1.1724); ir (CHCl$_3$) 1705, 1175 cm$^{-1}$; nmr (CDCl$_3$) δ 7.77 (d,2H), 7.30 (d, 2H), 2.08 (s,3H).

Anal. Calcd for $C_{28}H_{38}O_4S$ (MW 470.67): C, 71.45; H, 8.14; S, 6.81

Found : C, 71.38; H, 8.33; S, 6.60

EXAMPLE 2

6β-Methoxy-3α,5-cyclo-5α-pregnan-20-one

To a solution of pregn-5-en-3β-ol-20-one tosylate (459.1 g, 0.975 mol) in 3.5l of anhydrous methanol under a nitrogen atmosphere was added anhydrous pyridine (237 g, 3 mol). The reaction mixture was stirred and heated at 60° to 65° C until tlc showed the complete disappearance of starting material (approximately 4 hr). The reaction mixture was allowed to cool to room temperature and stand without stirring for 24 hr. The crystalline precipitate was collected and washed with 125 ml of dry methanol and placed under vacuum at room temperature overnight. 6β-Methoxy-3α,5-cyclo-5α-pregnan-20-one was obtained, m.p. 122°–124°C. The mother liquors were concentrated in vacuo and the solid mass fractionally recrystallized from hexane to give an additional 144.0 g of 6β-methoxy-3α,5-cyclo-5α-pregnan-20-one for a total yield of 250.1 g, m.p. 122°–124°; $[\alpha]_D^{25}$ +127.12°(CHCl$_3$, c 0.9904); ir (CHCl$_3$) 1,705, 1,090 cm$^{-1}$; nmr (CDCl$_3$)δ 3.35 (s, 3H), 2.75 (m, 1H).

Anal. Calcd for $C_{22}H_{34}O_2$ (MW 330.50): C, 79.95; H, 10.37

Found: C, 79.84; H, 10.39

EXAMPLE 3

20(S)-6β-Methoxy-20-vinyl-3α,5-cyclo-5α-pregnan-20-ol

To 224 ml (0.56 mol) of vinyl magnesium chloride solution in 700 ml of dry tetrahydrofuran under a nitrogen atmosphere at room temperature was added dropwise an 800 ml solution of anhydrous tetrahydrofuran containing 6β-methoxy-3α,5-cyclo-5α-pregnan-20-one (100 g, 0.303 mol). The reaction mixture was stirred for 2.74 hr, refluxed for 1 hr, and then stirred at room temperature for 16 hr. The excess Gringnard reagent was destroyed with saturated sodium sulfate solution. Filtration, concentration of the solvent in vacuo, and recrystallization of the crude product from petroleum ether (30°-60°C) gave 78.7 g of product. Several more crops afforded a total of 93.1 g of 20(S)-6 α-methoxy-20-vinyl-3 ,5-cyclo-5α-pregnan-20-ol. Several recrystallizations from petroleum ether (30°-60°C) afforded the analytical sample, m.p. 92.5-94°C; $[\alpha]_D^{25}$ +28.05 °(CHCl$_3$, c 1.0376); ir (CHCL$_3$) 3,600 cm$^{-1}$; nmr (CDCl$_3$) δ 6.10 (q, 1H), 4.92 (m, 1H).

Anal. Calcd for $C_{24}H_{38}O_2$(MW 358.60): C, 80.40; H, 10.68

Found: C, 80.65; H, 10.56

EXAMPLE 4

Mixture of 6 α-Methoxy-3α, 5-cyclo-5α-27norcholest-20(22)cis-en-25-one and 6α-Methoxy-3 α, 5-cyclo-5 α-27-nor-cholest-20(22)trans-en-25-one To a stirred suspension of 20(S)-6α-methoxy-20-vinyl-3 α,5-cyclo 5α-pregnan-20-ol (98.7 g, 0.276 mol) in 300 ml of decalin under a nitrogen atmosphere was added s-collidine (918 g, 0.081 mol) followed by diketene (46.7 g, 0.552 mol). The reaction mixture was heated to 210°C for 50 min. and then the solvent, s-collidine, and excess diketene were removed by vacuum distillation (1.0-0.07 mm at 100°C). The residue was dissolved in 300 ml of toluene, maleic anhydride (30.0 g., 0.303 mol) was added, and the total heated to 100° for 3 hr. The solvent was removed in vacuo to give 155.4 g of a dark brown syrupty residue which was dissolved in 3 l of ether and washed with 4 × 250 ml of 1 N sodium hydroxide solution. The base extracts were washed with ether and combined with the above ether fraction and dried over 500 g anhydrous sodium sulfate. Filtration and evaporation of the solvent in vacuo gave 109.7 g of a syrup which was dissolved in 500 ml of benzene and filtered through a 2.5 cm × 10 cm bed of silica gel. The silica gel was washed with 2.5 l of benzene and the solvent evaporated in vacuo to give 94.95 g of crude viscous orange syrup. Vpc analysis of the crude product mixture showed the presence of two major components in a ratio of approximately 2 to 1. The analytical samples were obtained by preparative thick layer chromatography on silica gel (11:1 benzene-ether). 6β-Methoxy-3α,5-cyclo-5α-27-norcholest-20(22) trans-en-25-one, oil;$[\alpha]_D^{25}$ +37.74°(CHCl$_3$,c 1.0709); ir (CHCl$_3$) 1,715, 1,660 cm$^{-1}$; nmr (CDCl$_3$) δ 5.11 (m 1H), 3.29 (s, 3H), 2.75 (t, 1H), 2.10 (s, 3H), 1.61 (s, 3H), 1.00 (s, 3H), 0.54 (s, 3H): molecular ion at m/e 398.

Anal. Calcd for $C_{27}H_{42}O_2$ (MW 398.63): C, 81.35; H, 10.62

Found: C, 81.03; H, 10.58

6β-Methoxy-3 α,5-cyclo-5 α-27-norcholest-20(22) cis-en-25-one, oil;$[\alpha]_D^{25}$ −3.46°(CHCl$_3$,c 0.9815); ir (CHCl$_3$) 1,715 cm$^{-1}$; nmr (CDCl$_3$) δ 5.20 (m, 1H), 3.30 (s, 3H), 2.75 (t, 1H), 2.11 (s, 3H), 1.64 (d, 3H, J = 8 Hz), 1.01 (s, 3H), 0.78 (s, 3H); molecular ion at m/e 398.

Anal. Calcd for $C_{27}H_{42}O_2$ (MW 398.63): C, 81.35; H, 10.62

Found: C, 81.59; H, 10.55

EXAMPLE 5

Mixture of 20(R)-6β-Methoxy-3α,5-cyclo-5α-27-norcholestan-25-one and 20(S)-6β-Methoxy-3α,5-cyclo-5α-27-norcholestan-25-one A crude mixture of 6β-methoxy-3α,5-cyclo-5α-27-norcholest-20(22) cis-en-25-one(6.62g) and 6β-methoxy-3α,5-cyclo-5α-27-norcholest-20(22)trans-en-25-one was hydrogenated at one atmosphere in 60 ml of 95% ethanol using platinum oxide catalyst (0.66 g). After one-half hr, hydrogen uptake had ceased at 676 ml. Celite was added, the catalyst filtered, and the solvent evaporated in vacuo to give 6.49 g of a straw colored viscous oil. Tlc of the crude reaction product showed two major products which were isolated and characterized by preparative thick layer chormatography and were present in a ratio of approximately 1.5 to 1. The major component was 20(R)-6β-methoxy-3α,5-cyclo-5α-27-norcholestan-25-one, oil; $[\alpha]_D^{25}$ +47.97° (CHCl$_3$, c 1.0715); ir (CHCl$_3$) 1,715 cm$^{-1}$; nmr (CDCl$_3$) δ 3.33 (s, 3H), 2.78 (t, 1H, J = 2.5 Hz), 2.15 (s, 3H), 1.03 (s, 3H), 0.94 (d, 3H, J = 6.5 Hz), 0.70 (s, 3H); molecular ion at m/e 400.

Anal. Calcd for $C_{27}H_{44}O_2$ (MW 400.65): C, 80.94; H, 11.07

Found: C, 80.64; H, 10.88

The minor component was 20(S)-6β-methoxy-3 α,5-cyclo-5 α-27-norcholestan-25-one, oil;$[\alpha]_D^{25}$ +38.87°(CHCl$_3$, c 1.0650); ir (CHCl$_3$), 1,715 cm$^{-1}$; nmr (CDCl$_3$) δ 3.83 (s, 3H), 2.77 (t, 1H, J = 2.5 Hz), 2.13 (s, 3H), 1.03 (s, 3H), 0.84 (d, 3H, J = 6.5 Hz), 0.71 (s, 3H); molecular ion at m/e 400.

Anal. Calcd for $C_{27}H_{44}O_2$ (MW 400.65): C, 80.94; H, 11.07

Found: C, 80.76; H, 10.92

EXAMPLE 6

20(R)-6β-Methoxy-3α,5-cyclo-5α-cholestan-25-ol and 20(s)-6β-Methoxy-3 α,5-cyclo-5α-cholestan-25-ol To a crude mixture of 20(R)-6β-methoxy-3α,5-cyclo-5α,27-norcholestan-25-one and 20(S)-6β-methoxy-3α,5-cyclo-5α-27-norcholestan-25-one (92.84 g) dissolved in 600 ml of anhydrous ether at room temperature under a nitrogen atmosphere was added dropwise over a 30 min. period, 89.6 ml (0.252 mol) of a 2.8M etheral solution of methylmagnesium iodide diluted with 200 ml of anhydrous ether. After stirring for 1.5 hr. at room temperature, tlc showed complete disappearance of starting material. The excess Grignard reagent was destroyed by careful dropwise addition of 15 ml of saturated sodium sulfate solution. Then anhydrous sodium sulfate (300 g) was added, the solution stirred for 1 hr., and filtered through a pad of Celite. The filter cake was washed with ether (4 × 500 ml) followed by dichloromethane (4 × 250 ml). The solvent was concentrated to 1 l., washed with 10% sodium bisulfite (500 ml), then immediately with 8% sodium bicarbonate solution. The organic fraction was dried over anhydrous sodium sulfate (500 g), filtered, and the solvent evaporated in vacuo to a semi-solid mass which was crystallized from 400 ml of hexane to give 34.0 g of crude 6α-methoxy-3α,5-cyclo-5α-cholestan-25-ol. Recrystallization of the substance from hexane afforded four crops weighing 27.3 g. The mother liquors from the 34.0 g crop upon concentration and keeping in the cold for 3 days gave an additional 3.1 g for a total weight of 30.4 g. Several recystallizations from hexane afforded the analytical sample, m.p. 155–157°; $[\alpha]_D^{25}$ +49.07° (CHCl$_3$, c 0.9945); ir (CHCl$_3$) 3,615 cm$^{-1}$; nmr (CDCl$_3$) δ 3.30 (s, 3H), 2.75 (t, 1H, J = 3 Hz), 1.20 (s, 6H), 1.02 (s, 3H), 0.92 (d, 3H, J = 6 Hz), 0.71 (s, 3H): molecular ion m/e 416.

Anal. Calcd for $C_{28}H_{48}O_2$ (MW 416.69): C, 80.71; H, 11.61

Found: C, 80.61; H, 11.82

The mother liquors from the initial 34.0 g crop were rich in 20(S)-6β-methoxy-3α,5-cyclo-5α-cholestan-25-ol. Purification by thick layer chromatography gave the analytical sample, oil; $[\alpha]_D^{25}$ +35.23° (CHCl$_3$, c 0.5195); ir (CHCl$_3$) 3,615 cm$^{-1}$; nmr (CDCl$_3$) δ 3.29 (s, 3H), 2.75 (t, 1H, J = 3 Hz), 1.20 (s, 6H), 1.01 (s, 3H), 0.83 (d, 3H, J = 6 Hz), 0.71 (s, 3H); molecular ion m/e 416.

Anal. Calcd for $C_{28}H_{48}O_2$ (MW 416.69): C, 80.71; H, 11.61

Found : C, 80.42; H, 11.40

EXAMPLE 7

25-Hydroxycholesterol

To 10 ml of dioxane containing 1.5 ml of water at room temperature under a nitrogen atmosphere was added 6β-methoxy-3α,5-cyclo-5α-cholestan-25-ol, (0.50 g, 1.2 mmol) and the reaction mixture heated to 80°–85° until it became homogeneous. Then p-toluenesulfonic acid (0.06 g) was added and heating was continued for 6 hr at 80° C. The reaction mixture was cooled, poured into 10 ml of 2 N sodium carbonate, and extracted with 3 × 15 ml of dichloromethane. The combined extracts were washed with 10 ml of water, dried over anhydrous sodium sulfate and the solvent evaporated in vacuo to give 0.50 g of white crystalline solid. Recrystallization from methanol gave 0.45 g of 25-hydroxycholesterol, m.p. 174°–176°C. The analytical sample was obtained by thick layer chromatography followed by recrystallization from methanol, m.p. 179–181°C;$[\alpha]_D^{25}$ −38.39°(CHCl$_3$, c 1.0576); ir (CHCl$_3$) 3,615 cm$^{-1}$; nmr (CDCl$_3$) δ 5.34 (m, 1H), 3.47 (m, 1H), 1.20 (s, 6H), 1.00 (s, 3H), 0.93 (d, 3H, J = 5.5 Hz), 0.67 (s, 3H); molecular ion m/e 402.

Anal. Calcd for $C_{27}H_{46}O_2$ (MW 402.66): C, 80.54; H, 11.52

Found: C, 80.38; H, 11.46

EXAMPLE 8

25-Hydroxycholesterol-3β-acetate

To 25-hydroxycholesterol (0.50 g, 1.24 mmol) suspended in 5 ml of dry pyridine under a nitrogen atmosphere was added acetic anhydride (0.25 g, 2.5 mmol). The reaction mixture was stirred at room temperature for 20 hr., poured into 50 ml of saturated sodium bicarbonate solution, and extracted with 4 × 50 ml of dichloromethane. The organic extracts were washed with water, dried over anhydrous sodium sulfate, and evaporated in vacuo to an oil. The oil was taken up in dichloromethane (50 ml) and washed with 2 × 75 mol of 2 N sulfuric acid followed by saturated sodium bicarbonate solution. After drying (sodium sulfate) and evaporation of the solvent, the crude crystalline product from acetone (three crops) to give 0.444 g of 25-hydroxycholesterol 3β-acetate. Several recrystallizations from acetone gave the analytical sample, m.p. 139°–140°C (lit., m.p. 138.5°–140°C); $[\alpha]_D^{25}$ −42.37° (CHCl$_3$, c 1.0031); ir (CHCl$_3$), 3620, 1,725 cm$^{-1}$; nmr (CDCl$_3$) δ 5.38 (m, 1H), 4.60 (m, 1H), 2.02 (s, 3H), 1.21 (s, 6H), 1.02 (s, 3H), 0.93 (d, 3H, J = 5 Hz), 0.68 (s, 3H); mass spec. m/e 384 (M-HOAc).

Anal. Calcd for $C_{29}H_{48}O_3$ (MW 444.7): C, 78.32; H, 10.88

Found: C, 78.05; H, 11.10

EXAMPLE 9

20(S)-25-Hydroxycholesterol

To 100 ml of dioxane diluted with 15 ml of water was added 20(S)-6β-methoxy-3α,5-cyclo-5 α-cholestan-25-ol (4.5 g, 10.0 mmol) followed by p-toluenesulfonic acid (0.54 g). The reaction mixture was heated at 80°C for 18 hr., cooled to room temperature, and allowed to stand for 36 hr. The white crystalline precipitate was collected and dried affording 2.14 g of 20(S)-25-hydroxycholesterol, m.p. 180°–185°C. The filtrate was poured into 100 ml of water containing 50 ml of 2 N sodium carbonate, and extracted with 4 × 50 ml of chloroform. The combined extracts were dried over anhydrous sodium sulfate and concentrated in vacuo. The oily residue was dissolved in pentane and seeded to give an additional 0.20 g of product, m.p. 175°–180°C. The analytical sample was recrystallized several times from chloroform, m.p. 189.5–190.5°C;$[\alpha]_D^{25}$ −41.50° (CHCl$_3$, c 0.9278); ir (CHCl$_3$) 3,615 cm$^{-1}$; nmr (CDCl$_3$) δ 5.34 (m, 1H), 3.45 (m, 1H), 1.22 (s, 6H), 1.02 (s, 3H), 0.84 (d, 3H, J = 6 Hz), 0.68 (s, 3H); molecular ion m/e 402.

Anal. Calcd for $C_{27}H_{46}O_2$ (MW 402.66): C, 80.54; H, 11.52

Found: C, 80.81; H, 11.67

EXAMPLE 10

6β-Methoxy-3α,5-cyclo-5α-cholest-20(22)cis-en-25-ol

A solution of 6β-methoxy-3α,5-cyclo-5α-27-norcholest-20(22) cis-en-25-one (1.2 g, 2.9 mmol) in 25 ml of dry tetrahydrofuran was added dropwise over 10 min. to a solution of methylmagnesium iodide (12 mmol) in 25 ml of dry tetrahydrofuran with stirring at room temperature under a nitrogen atmosphere. Stirring was continued for 60 hr. The reaction mixture was diluted with 500 ml of ether and the excess Grignard reagent decomposed with saturated sodium sulfate solution. The ether layer was washed with brine, dried over anhydrous magnesium sulfate, filtered and evaporated to give 1.29 g of crude oily product. Purification by thick layer chromatography (silica gel, 11:1 benzene-ether) gave 0.87 g of 6β-methoxy-3 α,5-cyclo-5α-cholest-20(22) cis-en-25-ol, oil ($R_f$ = 0.32); $[\alpha]_D^{25}$ −8.0° (CHCl$_3$, c 0.84); ir (CHCl$_3$) 3,610 cm$^{-1}$; nmr (CDCl$_3$) δ 5.29 (m, 1H), 3.34 (s, 3H), 2.75 (t, 1H, J = 3 Hz), 1.72 (s, 3H), 1.24 (s, 6H), 1.04 (s, 3H), 0.72 (s, 3H); molecular ion m/e 414.

Anal. Calcd for $C_{28}H_{46}O_2$ (MW 414.67): C, 81.10; H, 11.18

Found: C, 80.81; H, 11.07

EXAMPLE 11

6β-Methoxy-3α,5-cyclo-5α-cholest-20(22)trans-en-25-ol

To 4 ml of methylmagnesium iodide (2.79 M, 11.6 mmol) in 5 ml of dry tetrahydrofuran at room temperature under nitrogen was added dropwise a 2 ml solution of 6 β-methoxy-3α,5-cyclo-5α-27-norcholest-20(22)trans-en-25-one (0.373 g, 0.937 mmol). The reaction mixture was stirred at room temperature for 1 hr. and then poured into saturated sodium sulfate solution. After extraction with ether, the combined extracts were dried over anhydrous sodium carbonate, filtered, and the solvent removed in vacuo giving 0.34 g of 6β-methoxy-3α,5-cyclo-5α-cholest-20(22)trans-en-25-ol which slowly solidified and could be recrystallized from pentane, m.p. 71°-73°C; $[\alpha]_D^{25}$ +35.5° (CHCl$_3$, c 0.935); ir (CHCl$_3$) 3,615 cm$^{-1}$; nmr (CDCl$_3$) δ 3.27 (s, 3H), 2.75 (t, 1H, J = 3 Hz), 1.60 (s, 3H), 1.19 (s, 6H), 0.98 (s, 3H), 0.54 (s, 3H); molecular ion m/e 414.

Anal. Calcd for $C_{28}H_{46}O_2$ (MW 414.67): C, 81.10; H, 11.18

Found: C, 80.93; H, 11.07

EXAMPLE 12

20(R)-3β-Acetoxy-27-norcholest-5-en-25-one

A solution of 20(R)-6β-methoxy-3 α,5-cyclo-5α-27-norcholestan-25-one (1.70 g, 4.25 mmol) in 35 ml of glacial acetic acid under a nitrogen atmosphere was heated at 75°C for 16 hr. The reaction mixture was cooled, poured into 500 ml of water containing 50 g of sodium carbonate, and extracted with 5 × 200 ml of dichloromethane. The combined organic extracts were washed with water, dried over anhydrous sodium sulfate, filtered, and evaporated in vacuo. The crude residue was recrystallized from 95% ethanol to give 1.45 g of 20(R)-3β-acetoxy-27-norcholest-5-en-25-one. A second crop afforded 0.104 g. The analytical sample was recrystallized from 95% ethanol, m.p. 139–140°C;$[\alpha]_D^{25}$ −45.00°(CHCl$_3$, c 1.0910); ir 1,720 cm$^{-1}$; nmr (CDCl$_3$) δ 5.39 (m, 1H), 4.64 (m, 1 H), 2.15 (s, 3H), 2.05 (s, 3H), 1.03 (s, 3H), 0.95 (d, 3H, J = 6 Hz), 0.69 (s, 3H); mass spec. m/e 368 (M-HOAc).

Anal. Calcd for $C_{28}H_{44}O_3$ (MW 428.66): C, 78.46; H, 10.35

Found: C, 78.28; H, 10.56

EXAMPLE 13

20(S)-3β-Acetoxy-27-norcholest-5-en-25-one

A solution of 20(S)-6β-methoxy-3α,5-cyclo-5α-27-norcholestan-25-one (1.35 g, 3.38 mmol) in 30 ml of glacial acetic acid under a nitrogen atmosphere was heated at 75°C for 16 hr. The reaction mixture was cooled, poured into 500 ml of water containing 45 g of sodium carbonate, and extracted with 5 × 200 ml of dichloromethane. The combined organic extracts were washed with water, dried over anhydrous sodium sulfate, filtered, and evaporated in vacuo. The crude residue was recrystallized from 95% ethanol to give 0.687 g. A second crop afforded 0.285 g for a total yield of 0.972 g of 20(S)-3β-acetoxy-27-norcholest-5-en-25-one. Several recrystallizations from 95% ethanol gave the analytical sample, m.p. 88–90°C; $[\alpha]_D^{25}$ −59.72° (CHCl$_3$, c 0.9940); ir (CHCl$_3$) 1,720 cm$^{-1}$ (broad); nmr (CDCl$_3$) δ 5.39 (m, 1H), 4.63 (m, 1H), 2.15 (s, 3H), 2.05 (s, 3H), 1.03 (s, 3H), 0.86 (d, 3H, J = 6 Hz), 0.69 (s, 3H); mass spec. m/e 368 (M-HOAc).

Anal. Calcd for $C_{28}H_{44}O_3$ (MW 428.66): C, 78.46; H, 10.35

Found: C, 78.41; H, 10.36

EXAMPLE 14

20(S)-25-Hydroxycholesterol-3β-acetate

To 20(S)-25-hydroxycholesterol (2.0 g, 4.97 mmol) in 30 ml of dry pyridine at room temperature under a nitrogen atmosphere was added acetic anhydride (1.4 ml, 14.9 mmol). The reaction mixture was stirred at room temperature for 22 hr. and poured into a separatory funnel containing 300 ml dichloromethane, 150 ml water, and 150 ml of saturated sodium bicarbonate solution. After extraction, the aqueous phase was washed with 4 × 150 ml of dichloromethane. The combined organic phases were washed with 250 ml of water followed by 400 ml of 1 N hydrochloric acid, and then 250 ml of water. The organic phase was dried over anhydrous sodium sulfate, filtered, and the solvent removed in vacuo. After sitting overnight, the viscous oil crystallized. Recrystallization from pentane afforded 1.80 g of 25-hydroxycholesterol-3β-acetate. The analytical sample was obtained by thick layer chromatography on silica gel followed by recrystallization from pentane, m.p. 88–90°C; $[\alpha]_D^{25}$ −51.04°(CHCl$_3$, c 1.0130); ir (CHCl$_3$) 3620, 1,725 cm$^{-1}$; nmr (CDCl$_3$) δ 5.36 (m, 1H), 4.61 (m, 1H), 2.03 (s, 3H), 1.21 (s, 6H), 1.02 (s, 3H), 0.83 (d, 3H, J = 6 Hz), 0.68 (s, 3H); mass spec. m/e 384 (M-HOAc).

Anal. Calcd for $C_{29}H_{48}O_3$ (MW 444.70): C, 78.33; H, 10.88

Found: C, 78.27; H, 10.75

EXAMPLE 15

Mixture of 6β-Methoxy-3α,5-cyclo-5α-27-norcholest-20(22)-trans-en-25-one and 6β-Methoxy-3α,5-cyclo-5α-27-norcholest-20(22)cis-en-25-one prepared from 20(S)-6β-Methoxy-20-vinyl-3α,5-cyclo-5α-pregnan-20-ol using Ethylacetoacetate To 20(S)-6β-methoxy-20-vinyl-3α,5-cyclo-5α-pregnan-20-ol (0.50 g, 1.44 mmol) under a nitrogen atmosphere was added ethyl acetoacetate (0.205 g, 1.58 mmol) and the reaction vessel heated to 180°C for 1.25 hr. All volatile materials were removed under high vacuum and the crude tan oily residue was chromatographed on thick layer plates. The major product was 6β-methoxy-3α,5-cyclo-5α-27-norcholest-20(22)trans-en-25-one (0.224 g) and the minor product was 6 β-methoxy-3α,5-cyclo-5α-27-norcholest-20(22) cis-en-25-one (0.105 g). The nmr, ir, ms, and tlc behavior of both products were identical when compared with authentic material, prepared as above.

EXAMPLE 16

6β-Methoxy-3α,5-cyclo-5α-cholestan-25-ol by hydrogenation of a mixture of

6β-methoxy-3α,5-cyclo-5α-cholest-20(22)cis-en-25-ol and 6β-methoxy-3 α,5-cyclo-5α-cholest-20(22)trans-en-25-ol To a 2 to 1 mixture of 6β-methoxy-3α,5-cyclo-5α-cholest-20(22)-trans-en-25-ol and 6β-methoxy-3α,5-cyclo-5α-cholest-20(22) cis-en-25-ol (13.3 g, 0.0321 mol) dissolved in 250 ml of 95% ethanol was added platinum oxide (1.3 g) and the olefins hydrogenated at one atmosphere. After ¾ of the theoretical amount of hydrogen had been taken up, a white precipitate began to appear in the reaction vessel. After hydrogen uptake had ceased, the precipitate was dissolved with a minimum amount of dichloromethane, Celite was added, and the catalyst filtered. Evaporation of the solvent in vacuo gave a semi-solid mass which was dissolved in hot hexane and allowed to crystallize affording 7.0 g of 6β-methoxy-3α,5-cyclo-5α-cholestan-25-ol, m.p. 151°–153°C. A second crop afforded an additional 0.62 g for a total of 7.62 g. This material had identical ir, nmr, ms and tlc behavior as the authentic material prepared above.

EXAMPLE 17
Mixture of
6β-Methoxy-3α,5-cyclo-5α-cholest-20(22)cis-en-25-ol and
6β-Methoxy-3α,5-cyclo-5α-cholest-20(22)trans-en-25-ol from a mixture of
6β-Methoxy-3α,5-cyclo-5α-27-norcholest-20(22)cis-en-25-one and
6β-Methoxy-3α,5-cyclo-5α-27-norcholest-20(22)trans-en-25-one To a crude mixture of 6β-methoxy-3α,5-cyclo-5α-27-norcholest-20(22) cis-en-25-one and 6β-methoxy-3α,5-cyclo-5α-27-norcholest-20(22) trans-en-25-one (34.6 g) dissolved in 250 ml of dry tetrahydrofuran at room temperature under a nitrogen atmosphere was added methyl magnesium iodide (100 ml of a 2.5 M solution in ether) dropwise. After complete addition, the reaction mixture was stirred at room temperature for 5 hr., carefully poured into 500 ml of saturated sodium solution, and extracted with 6 × 1 l. of ether. The combined extracts were dried over anhydrous sodium sulfate and evaporated to give 24.3 g of viscous oil. The crude product was chromatographed on 850 g of silica gel to give 13.3 g of an approximate 2 to 1 mixture of 6β-methoxy-3α,5-cyclo-5α-cholest-20(22) trans-en-25-ol and 6β-methoxy-3α,5-cyclo-5α -cholest-20(22) cis-en-25-ol, respectively.

EXAMPLE 18

20(R)-6β-Methoxy-3α,5-cyclo-5α-cholestan-25-ol by hydrogenation of
6β-Methoxy-3α,5-cyclo-5α-cholest-20(22)cis-en-25-ol using 10% Rhodium on Carbon 6β-Methoxy-3α,5-cyclo-5α-cholest-20(22) cis-en-25-ol (0.300 g, 0.725 mmol) dissolved in 10 ml of ethanol was hydrogenated at one atmosphere over 100 mg of 10% rhodium on carbon until hydrogen uptake ceased. The reaction mixture was filtered through Celite, the filter pad washed with chloroform, and the solvent evaporated in vacuo to give 300 mg of crude product. Trituration of the residue with boiling petroleum ether (30°–60°) gave 138 mg of 20(R)-6β-methoxy-3α,5-cyclo-5α-cholestan-25-ol, m.p. 153°–155°C, which was chromatographically and spectrally identical to authentic material. Mixed melting point showed no depression.

EXAMPLE 19

20(R)-6β-Methoxy-3α,5-cyclo-5α-cholestan-25-ol by Hydrogenation of
6β-methoxy-3α,5-cyclo-5α-cholest-20(22)trans-en-25-ol over 10% Rhodium on Carbon 6β-Methoxy-3α,5-cyclo-5α-cholest-20(22) trans-en-25-ol (0.300 g, 0.725 mmol) dissolved in 10 ml of ethanol was hydrogenated at one atmosphere over 100 mg of 10% rhodium on carbon until hydrogen uptake ceased. The reaction mixture was filtered through Celite, the filter pad washed with chloroform, and the solvent evaporated in vacuo to give 277 mg of crude product. Recrystallization from petroleum ether (30°–60°) gave 123 mg, m.p. 149°–152°C, of 20(R)-6β-methoxy-3α,5-cyclo-5α-cholestan-25-ol. Several recrystallizations from hexane gave product, m.p. 155°–157°C, which was chromatographically and spectrally identical to authentic material. Mixed melting point showed no depression.

EXAMPLE 20

20(R)-6β-Methoxy-3α,5-cyclo-5α-cholestan-25-ol by Hydrogenation of
6β-Methoxy-3α,5-cyclo-5α-cholest-20(22)trans-en-25ol over Platinum Oxide 6β-Methoxy-3α,5-cyclo-5α-cholest-20(22)trans-en-25-ol (0.300 g, 0.725 mmol) was dissolved in 10 ml of a 1 to 1 mixture of dry dioxane and glacial acetic acid was hydrogenated at one atmosphere over 100 mg of platinum oxide until hydrogen uptake ceased. The reaction mixture was poured all at once into an excess of 2 N potassium carbonate solution and extracted with dichloromethane. The combined extracts were dried over anhydrous sodium sulfate, filtered and evaporated in vacuo to give 292 mg of a semi-solid residue. Trituration with hot hexane and then cooling gave 150 mg of 20(R)-6β-methoxy-3α,5-cyclo-5α-cholestan-25-ol, m.p. 151°– °C, which was chromatographically and spectrally identical to authentic material.

EXAMPLE 21

20(R)-6β-Methoxy-3α,5-cyclo-5α-cholestan-25-ol by Hydrogenation of
6β-Methoxy-3α,5-cyclo-5α-cholest-20(22)cis-en-25-ol over Platinum Oxide 6β-Methoxy-3α,5-cyclo-5α-cholest-20(22) cis-en-25-ol (0.300 g, 0.725 mmol) was dissolved in 10 ml of a 1 to 1 mixture of dry dioxane and glacial acetic acid was hydrogenated at one atmosphere over 100 mg of platinum oxide until hydrogen uptake ceased. The reaction mixture was poured all at once into an excess of 2 N potassium carbonate solution and extracted with 3 × 50 ml of dichloromethane. The combined extracts were dried over anhydrous sodium sulfate, filtered, and evaporated in vacuo to give 294 mg of a semi-solid residue. Trituration with hot hexane and cooling gave 138 mg of 20(R)-6β-methoxy-3α,5-cyclo-5α-cholestan-25-ol, m.p. 151°–154°C, which was chromatographically and spectrally identical to authentic material.

EXAMPLE 22

25-Hydroxycholesterol from 3β-Acetoxy-27-norcholest-5-en-25-one

To 3β-acetoxy-27-norcholest-5-en-25-one (0.156 g, 0.364 mmol) dissolved in 10 ml of anhydrous ether at room temperature under a nitrogen atmosphere was added dropwise methylmagnesium chloride (0.43 ml of a 3.35 M solution in tetrahydrofuran diluted with 10 ml of ether). The reaction mixture was stirred at room temperature for 1.5 hr and the excess Grignard reagent destroyed by the dropwise addition of saturated sodium sulfate solution. After the addition of anhydrous sodium sulfate and filtration of the salts, evaporation of the solvent gave 0.174 g of crude product. Recrystallization from 95% ethanol afford 0.129 g of 25-hydroxycholesterol, m.p. 177°–180°C, which was spectrally and chromatographically identical with authentic material.

EXAMPLE 23

20(S)-Vinylpregn-5-en-3β,20-diol 3-acetate

To a cooled (0°C) solution of vinylmagnesium chloride (60 ml of 2.67 molar, 160 mmol) diluted to 260 ml volume with dry tetrahydrofuran was added dropwise, hexamethylphosphoric triamide (57.3 g, 320 mmol). After complete addition, the solution was allowed to warm to room temperature and pregn-5-en-20-one 3β-acetate (17.9 g, 50 mmol) dissolved in 130 ml of anhydrous tetrahydrofuran was added dropwise over a 20-minute period. After stirring for 24 hr. at room temperature, a precipitate had appeared. With vigorous stirring, the excess Grignard reagennt was neutralized with 60 ml of saturated sodium sulfate solution. The solution was then dried over 200 g of anhydrous sodium sulfate, filtered, and the filter cake washed with 5 × 200 ml of ethyl acetate. The solvent was removed in vacuo, the residue dissolved in ether (1 liter) and washed with 5 × 200 ml of water. The water layer was backwashed with ether and the total combined ether extracts were evaporated in vacuo to give 20.3 g of crude product which was acetylated without further purification. To the crude product, 20.2 g, dissolved in 200 ml of pyridine under a nitrogen atmosphere was added acetic anhydride (18.0 g, 0.176 mol), the reaction mixture was stirred at room temperature overnight, and then poured into 300 ml of dichloromethane overlaid with 300 ml of 10% sodium bicarbonate solution. The layers were separated and the aqueous phase extracted with 4 × 100 ml of dichloromethane. The combined organic extracts were washed with water and evaporated in vacuo. The residual pyridine was removed by dissolving the residue in 300 ml of dichloromethane and washing with 5 × 100 ml of 2 N sulfuric acid (or until the aqueous wash was pH 1–2). The organic layer was washed with 100 ml of 10% sodium bicarbonate solution, dried over anhydrous sodium sulfate, filtered, and the solvent removed in vacuo to give 20.3 g of crude crystalline 20-(S)-vinylpregn-5-en-3β,20-diol 3-acetate. The analytical sample was obtained by several recrystallizations from methanol, m.p. 163°–164°C; $[\alpha]_D^{25}$ −69.70° (CHCl$_3$, c 1.1142); ir (CHCl$_3$) 3615, 1,730 cm$^{-1}$; nmr (CDCl$_3$) δ 5.98 (d of d, 1H, J = 11 (cis) and 17 Hz (trans)), 5.38 (m, 1H), 5.13 (d of d, 1H, J = 2 (gem) and 17 Hz (trans)), 4.95 (d of d, 1H, J = 2 (gem) and 11 Hz (cis)); mass spec. m/e 371 (m-CH$_3$).

Anal. Calcd for C$_{25}$H$_{38}$O$_3$ (MW 386.58): C, 77.68; H, 9.91

Found: C, 77.96; H, 9.75

EXAMPLE 24

Mixture of 27-Norcholesteryl-20(22)cis-en-25-one 3β-Acetate and 27-Norcholesteryl-20(22)trans-en-25-one 3β-Acetate To 20(S)-vinylpregn-5-en-3β,20-diol 3-acetate (5.0 g, 13 mmol) suspended in 25 ml of decalin under a nitrogen atmosphere was added s-collidine (0.5 g) and freshly distilled diketene (2.18 g, 26.0 mmol). The reaction mixture was heated at 80°C for 30 min and then at 200°C for 1 hr and 10 min. Distillation (5 mm – 0.1 mm at 25°–110°C) of the excess diketene and decalin gave 5.88 g of viscous residue which was chromatographed on 200 g of silica gel. After elution with 2500 ml of benzene, elution with 50 to 1 benzene:ether (1500 ml) afforded 3.96 g of a 2 to 1 mixture of two isomeric products which could be completely separated by preparative thick layer chromatography. The major isomer was 27-norcholesteryl-20(22) trans-en-25-one 3β-acetate. The analytical sample was recrystallized from 95% ethanol, m.p. 120-121°C; $[\alpha]_D^{25}$ −53.06°(CHCl$_3$,c 1.0215); ir (CHCl$_3$) 1725 cm$^{-1}$ (broad); nmr (CDCl$_3$)δ 5.38 (m, 1H), 5.13 (m, 1H), 4.60 (m, 1H), 2.13 (s, 3H), 2.02 (s, 3H), 1.65 (s, broad, 3H), 1.01 (s, 3H), 0.52 (s, 3H); molecular ion m/e 426.

Anal. Calcd for C$_{28}$H$_{42}$O$_3$ (MW 426.64): C, 78.83; H, 9.92

Found: C, 78.87; H, 10.07

The minor isomer was 27-norcholesteryl-20(22) cis-en-25-one 3-acetate. The analytical sample was recrystallized from pentane, m.p. 84°–86°C; $[\alpha]_D^{25}$ −117.15°(CHCl$_3$, c 0.9654); ir (CHCl$_3$), 1,725 cm$^{-1}$ (broad); nmr (CDCl$_3$) δ 5.38 (m, 1H), 5.22 (m, 1H), 4.64 (m, 1H), 2.12 (s, 3H), 2.02 (s, 3H), 1.69 (s, broad, 3H), 1.01 (s, 3H), 0.65 (s, 3H); mass spec m/e 366 (M-60).

Anal. Calcd for C$_{28}$H$_{42}$O$_3$ (MW 426.64): C, 78.83; H, 9.92

Found: C, 78.85; H, 10.02

EXAMPLE 25

20(R)-27-Norcholesteryl-25-one 3β-Acetate by Hydrogenation of a Mixture of 27-Norcholesteryl-20(22)cis-en-25-one 3β-Acetate and 27-Norcholesteryl-20(22)trans-en-25-one 3β-Acetate A mixture of 27-norcholesteryl-20(22) cis-en-25-one 3β-acetate and 27-norcholesteryl-20(22) trans-en-25-one 3β-acetate (1.86 g, 4.37 mmol) in 80 ml of 95% ethanol was hydrogenated at one atmosphere over prereduced platinum oxide catalyst (0.186 g). After approximately 75% of the hydrogen had been taken up, a precipitate began to appear but had no effect on the reaction. A small amount of dichloromethane was added, the catalyst filtered, and the solvent evaporated in vacuo to give 1.9 g of crude product which was recrystallized to give 0.85 g of 27-norcholesteryl-25-one 3β-acetate, m.p. 138°–140°C. A second crop afforded an additional 0.086 g, m.p. 129°–132°C for a total yield of 0.93 g. The analytical sample was recrystallized from 95% ethanol, m.p. 139–140°C; $[\alpha]_D^{25}$ −45.26°(CHCl$_3$, c 1.0032); ir (CHCl$_3$) 1720 cm$^{-1}$ (broad); nmr (CDCl$_3$) δ 5.29 (m, 1H), 4.64 (m, 1H), 2.15 (s, 3H), 2.05 (s, 3H), 1.03 (s, 3H), 0.95 (d, 3H, J = 6 Hz), 0.69 (s, 3H); m/e 368 (M-HOAc).

Anal. Calcd for C$_{28}$H$_{44}$O$_3$ (MW 428.66): C, 78.46; H, 10.35

Found: C, 78.56; H, 10.64

EXAMPLE 26

20(R)-27-Norcholesteryl-25-one 3β-Acetate by Hydrogenation of 27-Norcholesteryl-20(22)cis-en-25-one 3β-Acetate 27-Norcholesteryl-20(22) cis-en-25-one (0.152 g, 0.357 mmol) was hydrogenated at one atmosphere in 8 ml of 95% ethanol over prereduced platinum oxide (0.015 g) at room temperature for 1.25 hr. The catalyst was filtered and the solvent evaporated in vacuo to give 0.146 g of crude product which was crystallized from 95% ethanol affording two crops, 0.068 g of 20(R)-27-norcholesteryl-25-one 3β-acetate, m.p. 137°–139°C. The product was identical in all respects to authentic material.

EXAMPLE 27

20(R)-27-Norcholesteryl-25-one 3β-Acetate by hydrogenation of 27-norcholesteryl-20(22)trans-en-25-one 3β-Acetate 27-Norcholesteryl-20(22) trans-en-25-one (0.30 g, 0.7 mmol) was hydrogenated at one atmosphere in 25 ml of 95% ethanol over prereduced platinum oxide (0.030 g). Hydrogen uptake ceased at 14.4 ml. The slight precipitate of product in the reaction vessel was dissolved by addition of ethyl acetate, the catalyst was filtered, and the solvent evaporated in vacuo to give 0.31 g of crude product. Recrystallization from 95% ethanol gave 0.183 g of 20(R)-27-norcholesteryl-25-one 3β-acetate, m.p. 137°–138°C. The nmr, ir, and mass spectra were identical with those of authentic material. A mixture melting point determination also showed no depression, m.p. 138°–139°C.

EXAMPLE 28

25-Hydroxycholesterol from 20(R)-27-Norcholesteryl-25-one 3β-Acetate

To 3β-acetoxy-27-norcholestan-25-one (0.156 g, 0.364 mmol) dissolved in 10 ml of anhydrous ether at room temperature under a nitrogen atmosphere was added dropwise methylmagnesium chloride (0.43 ml of a 3.35 M solution in tetrahydrofuran diluted with 10 ml of ether). The reaction mixture was stirred at room temperature for 1.5 hr. and the excess Grignard reagent destroyed by the dropwise addition of saturated sodium sulfate solution. After the addition of anhydrous sodium sulfate and filtration of the salts, evaporation of the solvent gave 0.174 g of crude product. Recrystallization from 95% ethanol afforded 0.129 g of 25-hydroxycholesterol, m.p. 177°–180°C, which was spectrally and chromatographically identical with authentic material.

EXAMPLE 29

Pregn-5-en-3β-ol-20-one Tetrahydropyranyl Ether

To pregn-5-en-3β-ol-20-one (50.0 g, 0.158 m) dissolved in 500 ml of dry dichloromethane was added p-toluenesulfonic acid (0.15 g) followed by dihydropyran (14.0 g, 0.167 m) and the reaction mixture was stirred under a nitrogen atmosphere at room temperature overnight. After washing the dichloromethane with 50 ml of 6 N sodium hydroxide followed by drying over sodium sulfate, the solvent was evaporated in vacuo to give 63.6 g of crude product. Recrystallization from ether-petroleum ether (30°–60°C) gave 59.2 g of pregn-5-en-3β-ol-20-one 3-tetrahydropyranyl ether. One further recrystallization gave the analytical sample, m.p. 129°–130°C: $[\alpha]_D^{25}$ +18.78° (CHCl$_3$, c 0.9960); ir 1700 cm$^{-1}$; nmr (CDCl$_3$) δ 4.78; molecular ion m/e 400.

Anal. Calcd for C$_{26}$H$_{40}$O$_3$ (MW 400.60): C, 77.95; H, 10.06

Found: C, 78.04; H, 10.10.

EXAMPLE 30

20(S)-Vinylpregn-5n-3β,20-diol 3-Tetrahydropyranyl Ether

To pregn-5-en-3β-ol-20-one tetrahydropyranyl ether dissolved in 400 ml of anhydrous tetrahydrofuran at room temperature under a nitrogen atmosphere was added dropwise 28.1 ml of a vinylmagnesium chloride solution (2.67 M, 75 mmol) and the reaction mixture stirred for 16 hr. The solvent was evaporated by gentle warming under a nitrogen stream. Ethyl acetate (250 ml), saturated sodium sulfate solution (20 ml), and finely anhydrous sodium sulfate (100 g) was added. The solution was stirred for 1 hr and filtered. Removal of the solvent in vacuo afforded 22.3 g of crude product. Recrystallization from acetone gave 20.01 g of 20-(S)-vinylpregn-5-en-3β,20-diol 3-tetrahydropyranyl ether, m.p. 163°–167°C. An additional recrystallization gave the analytical sample, m.p. 167°–171°C: $[\alpha]_D^{25}$ −32.96° (CHCl$_3$, c 0.9466); ir (CHCl$_3$) 3,620 cm$^{-1}$; nmr (CDCl$_3$) δ 5.99 (d of d, 1H, J = 11 (cis) and 17 Hz (trans)), 5.14 (d of d, 1H, J = 2 (gem) and 17 Hz (trans)), 4.94 (d of d, 1H, J = 2 (gem) and 11 Hz (cis)); molecular ion m/e 428.

Anal. Calcd for C$_{28}$H$_{44}$O$_3$ (MW 428.66): C, 78.46; H, 10.35

Found: C, 78.44; H, 10.42

EXAMPLE 31

27-Norcholesteryl-20(22)cis-en-25-one 3β-Tetrahydropyranyl Ether and 27-Norcholesteryl-20(22)trans-en-25-one 3β-Tetrahydropyranyl Ether To a suspension of 20(S)-vinylpregn-5-en-3β,20-diol 3-tetrahydropyranyl ether (9.78 g, 22.8 mmol) in 50 ml of decalin under a nitrogen atmosphere at room temperature was added s-collidine (0.98 g) and freshly distilled diketene (2.36 g, 28.2 mmol). The reaction mixture was stirred and heated in an oil bath at 80°C for 0.5 hr and then at 200°C for 1 hr, 40 min. An additional 1.4 g (17.1 mmol) of diketene was added and heating at 200°C was continued for 1 hr. All volatile material was removed by vacuum distillation. The crude oily residue (12.2 g) was chromatographed on 500 g of silica gel. Elution afforded 5.5 g of a 1 to 2 mixture of 27-norcholesteryl-20(22) cis-en-25-one 3β-tetrahydropyranyl ether and 27-norcholesteryl-20(22) trans-en-25-one 3β-tetrahydropyranyl ether. From this mixture, a small amount of 27-norcholesteryl-20(22) trans-en-25-one 3β-tetrahydropyranyl ether crystallized. Recrystallization from ether-petroleum ether (30°–60°C) gave material with m.p. 94–97°C: $[\alpha]_D^{25}$ −33.35° (CHCl$_3$, c 1.0345); ir (CHCl$_3$) 1,715 cm$^{-1}$; nmr (CDCl$_3$) δ 4.74 (m, 1H), 2.15 (s, 3H); molecular ion m/e 468.

Anal. Calcd for C$_{31}$H$_{48}$O$_3$ (MW 468.73): C, 79.44; H, 10.32

Found: C, 79.36; H, 10.42

Further elution gave 3.5 g of material which was a 1 to 2 mixture of 27-norcholesterol-20(22) cis-en-25-one and 27-norcholesterol-20(22) trans-en-25-one. Acetylation of a small portion of this material (0.25 g, 0.65 mmol) with acetic anhydride (0.33 g, 3.2 mmol) in pyridine (5 ml) after normal workup gave 0.25 g of a 1 to 2 mixture of 27-norcholesteryl-20(22) cis-en-25-one 3$\beta$-acetate and 27-norcholesteryl-20(22) trans-en-25-one 3$\beta$-acetate.

EXAMPLE 32

20(R)-27-Norcholesteryl-25-one 3 $\beta$-Tetrahydropyranyl Ether by Hydrogenation of a Mixture of 27-Norcholesteryl-20(22)-cis-en25-one 3 $\beta$-Tetrahydropyranyl Ether and 27-Norcholesteryl-20(22)trans-en-25-one 3 $\beta$-Tetrahydropyranyl Ether To a 1 to 2 mixture of 27-norcholesteryl-20(22) cis-en-25-one 3$\beta$-tetrahydropyranyl ether and 27-norchoelsteryl-20(22)trans-en-25-one 3$\beta$-tetrahydropyranyl ether (0.60 g, 1.28 mmol) in 10 ml of dry dioxane was added platinum oxide catalyst (0.060 g) and the mixture hydrogenated at one atmosphere. After 42 ml of hydrogen had been absorbed, uptake ceased. The catalyst was filtered with the aid of Celite and the solvent removed in vacuo to give 0.628 g of oily product. A portion of the crude product (0.476 g) was chromatographed on 65 g of silica gel and eluted with chloroform. Separation of the minor more polar component was not effected. The column chromatography produced 0.365 g of material which was chromatographed twice on preparative thick layer silica gel plates and gave 41 mg of 20(R)-27-norcholesteryl-25-one 3$\beta$-tetrahydropyranyl ether, m.p. 109°–110°C: [$\alpha$]D25 –25.85 °(CHCl$_3$, c0.5105); ir (CHCl$_3$) 1715 cm$^{-1}$; nmr (CDCl$_3$) $\delta$4.74 (m, 1H), 2.13 (s,3H), 0.93 (d,3H,J=6 Hz); mass spec. m/e 369 (M-101).

Anal. Calcd for C$_{31}$H$_{50}$O$_3$ (MW 470.74): C, 79.10; H, 10.71

Found: C, 79.11; H, 10.77

EXAMPLE 33

25-Hydroxycholesterol 3$\beta$-Tetrahydropyranyl Ether

To 0.490 g of a crude reaction product obtained as in Example 32 containing 20(R)-27-norcholesteryl-25-one 3 $\beta$tetrahydropyranyl ether dissolved in 20 ml of anhydrous ether was added dropwise at room temperature under a nitrogen atmosphere, methylmagnesium chloride (0.90 ml, 3.10 mmol diluted with 10 ml of dry ether). After stirring at room temperature for 1 hr, 5 ml of saturated sodium sulfate solution was added followed by 20 g of granular anhydrous sodium sulfate. Filtration and evaporation of the solvent in vacuo gave 0.49 g of crude product which was chromatographed on 40 g of Merck silica gel 60. Elution with benzene followed by 9 to 1 ethyl acetate-benzene afforded 257 mg of material which upon recrystallization gave 105 mg of 25-hydroxycholesterol 3 $\beta$-tetrahydropyranyl ether, m.p. 155°–156°, which was identical in all respects to an authentic sample prepared from 25-hydroxy-cholesterol as described below.

EXAMPLE 34

25-Hydroxycholesterol 3 $\beta$-Tetrahydropyranyl Ether and 25-Hydroxy-cholesterol 3 $\beta$,25-Ditetrahydropyranyl Ether To 25-hydroxycholesterol (40.0 g, 0.1 mol) suspended in 350 ml of dry dichloromethane at room temperature under a nitrogen atmosphere was added para-toluenesulfonic acid (0.1 g) followed by dropwise addition of dihydropyran (8.8 g, 0.105 mol) over a 0.5 hr period. An additional amount of dihydropyran was added (0.84 g, 0.01 mol) and stirring at room temperature was continued for 1 hr. The reaction mixture was filtered through Celite and evaporated to dryness. The oily product was chromatographed on 2 kg. of silica gel. 25-Hydroxycholesterol 3$\beta$, 25-ditetrahydropyranyl ether eluted first from the column (7.2 g). Recrystallization from pentane gave the analytical sample, m.p. 102°–104°C:[$\alpha$]D25–26.00°(CHCl$_3$, c 0.9423); nmr (CDCl$_3$)$\delta$4.76 (m, 2H).

Anal. Calcd for C$_{37}$H$_{62}$O$_4$ (MW570.90): C, 77.84; H, 10.95

Found: C, 77.81; H,11.14

Further elution afforded 36.5 g of 25-hydroxycholesterol 3$\beta$-tetrahydropyranl ether. Recrystallization from ether gave the analytical sample, m.p. 155°–158°C: [$\alpha$]D25 –31.93°(CHCl$_3$, c 1.0397); nmr (CDCl$_3$) $\delta$4.77 (m, 1H); molecular ion m/e 486.

Anal. Calcd for C$_{32}$H$_{54}$O$_3$ (MW 486.78): C, 78.96; H, 78.88

Found: C, 78.88; H, 11.62

EXAMPLE 35

20(S)-Vinylpregn-5-en-3$\beta$,20-diol 3-Acetate

To a vigorously stirred solution of pregn-5-en-3$\beta$-ol-20-one acetate (75 g, 0.21 mol) in 400 ml of dry dichloromethane cooled to −78°C under a nitrogen atmosphere was added dropwise over a period of 3.75 hr 460 ml of a solution of vinyl magnesium chloride which was prepared by diluting 250 ml of 2.05 M vinyl magnesium chloride in tetrahydrofuran with 250 ml of dry dichloromethane. After tlc indicated the complete disappearance of starting material, the dry ice bath was removed and immediately 90 ml of saturated sodium sulfate solution was added dropwise over a period of 5 min. After the neutralized reaction mixture had stirred at room temperature for 0.5 hr, it was dried over sodium sulfate, filtered through a filter aid plug and the solvent evaporated in vacuo to give 82 g of crude 20(S)-vinyl-pregn-5-en-3$\beta$, 20-diol 3-acetate.

The analytical sample was obtained by several recrystallizations from methanol, m.p. 163–164°C;[$\alpha$]D-25–69.70°(c 1.1142, CHCl$_3$); ir (CHCl$_3$) 3615, 1,730 cm$^-$;nmr (CDCl$_3$)$\delta$5.98 [d of d, 1H, J=11 and 17 Hz], 5.38 (m, 1H), 5.13[d of d, 1H, J=2 and 17 Hz], 4.95[d of d, 1H, J=2 and 11 Hz].

Anal. Calcd. for C$_{25}$H$_{38}$O$_3$ (MW 386.58): C, 77.68; H, 9.91

Found: H, 77.96; H, 9.75

We claim:

1. A compound of the formula

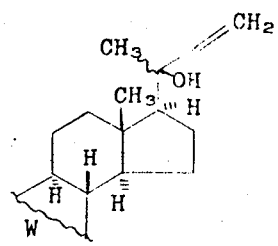

wherein W is one of the partial formulas

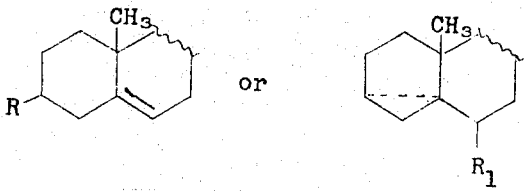

and R is hydroxy, tertiary lower alkoxy, benzyloxy, diphenylmethoxy, trityloxy, lower alkanoyloxy, benzoyloxy, acetoacetoxy, or a group of the formula

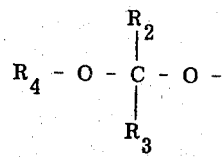

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy or acetoacetoxy.

2. The compound of claim 1 which is 6$\beta$-methoxy-20-vinyl-3$\alpha$,5-cyclo-5$\alpha$-pregnan-20-ol.

3. The compound of claim 1 which is 20-vinyl-pregn-5-en-3$\beta$,20-diol 3-acetate.

4. The compound of claim 1 which is 20-vinyl-pregn-5-en-3$\beta$,20-diol 3-tetrahydropyranyl ether.

5. A compound of the formula

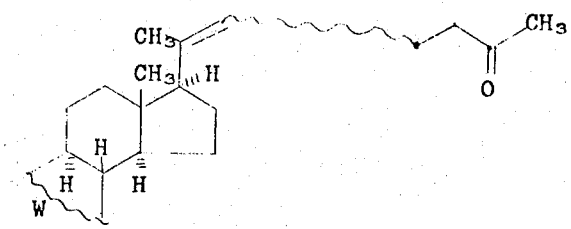

wherein W is one of the partial formulas

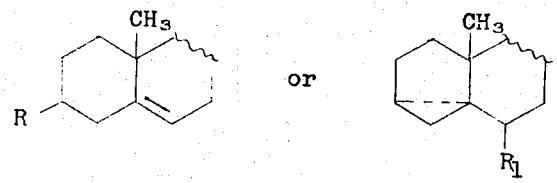

and R is hydroxy, tertiary lower alkoxy, benzyloxy, diphenylmethoxy, trityloxy, lower alkanoyloxy, benzoyloxy, acetoacetoxy, or a group of the formula

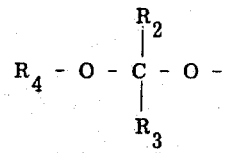

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy or acetoacetoxy.

6. The compound of claim 5 which is 6$\beta$-methoxy-3$\alpha$,5-cyclo-5$\alpha$-27-norcholest-20(22)en-25-one.

7. the compound of claim 5 which is 27-norcholesteryl-20(22)-en-25-one 3$\beta$-acetate.

8. The compound of claim 5 which is 27-norcholesteryl-20(22)-en-25-one 3$\beta$-tetrahydropyranyl ether.

9. A compound of the formula

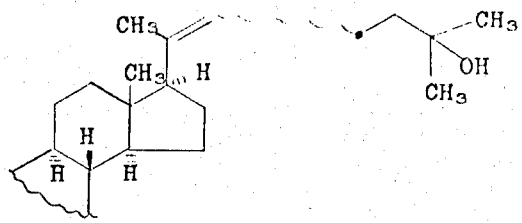

wherein W is one of the partial formulas

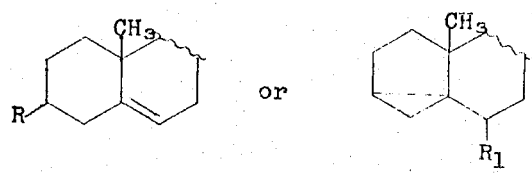

and R is hydroxy, tertiary lower alkoxy, benzyloxy, diphenylmethoxy, trityloxy, lower alkanoyloxy, benzoyloxy, acetoacetoxy, or a group of the formula

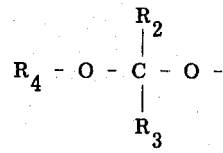

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy, or acetoacetoxy.

10. The compound of claim 9 which is 6$\beta$-methoxy-3$\alpha$,5-cyclo-5$\alpha$-cholest-20(22)-en-25-ol.

11. A compound of the formula

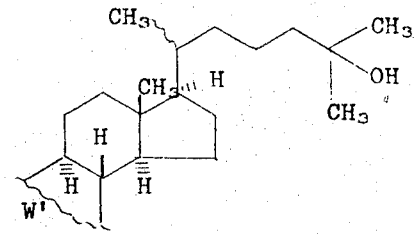

wherein W' is one of the partial formulas

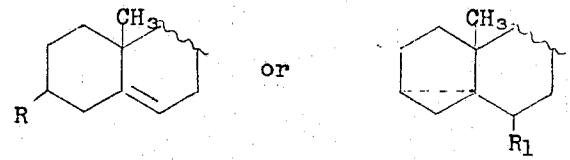

and R is hydroxy, tertiary lower alkoxy, benzyloxy, diphenylmethoxy, trityloxy, lower alkanoyloxy, benzoyloxy, acetoacetoxy, or a group of the formula

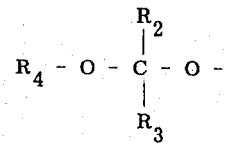

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy, or acetoacetoxy, but with the proviso that W' cannot be the first depicted partial formula when there is a 20(R) configuration.

12. The compound of claim 11 which is 6β-methoxy-3α,5-cyclo-5α-cholestan-25-ol.

13. The compound of claim 11 which is 20(S)-25-hydroxycholesteryl 3β-acetate.

14. The compound of claim 11 which is 20(S)-25-hydroxycholesteryl 3β-tetrahydropyranyl ether.

15. A compound of the formula

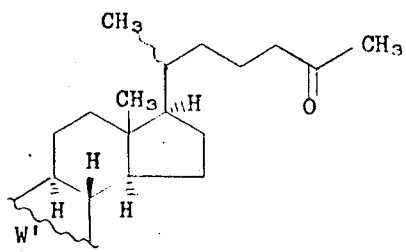

wherein W' is one of the partial formulas

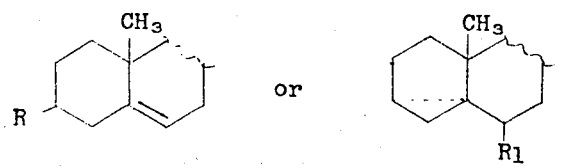

and R is hydroxy, tertiary lower alkoxy, benzyloxy, diphenylmethoxy, trityloxy, lower alkanoyloxy, benzoyloxy, acetoacetoxy, or a group of the formula

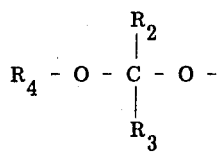

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy or acetoacetoxy, but with the proviso that W' cannot be the first depicted partial formula when there is a 20(R) configuration.

16. The compound of claim 15 which is 6β-methoxy-3α,5-cyclo-5α-27-norcholestan-25-one.

17. The compound of claim 15 which is 20(S)-27-norcholesteryl-25-one 3β-acetate.

18. The compound of claim 14 which is 20(S)-27-norcholesteryl-25-one 3β-tetrahydropyranyl ether.

19. A process for the preparation of a compound of the formula

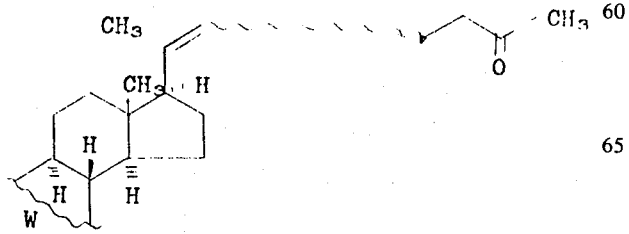

wherein W is one of the partial formulas

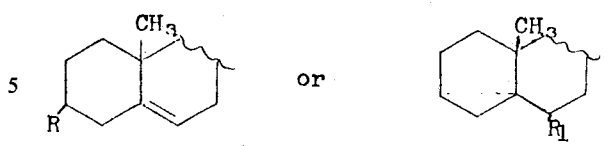

and R is hydroxy, tertiary lower alkoxy, benzyloxy, diphenylmethoxy, trityloxy, lower alkanoyloxy, benzoyloxy, acetoacetoxy, or a group of the formula

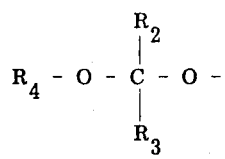

wherein $R_2$ is hydrogen or lower alkyl, $R_3$ and $R_4$ taken independently are each lower alkyl and $R_3$ and $R_4$ taken together are lower alkylene of from 3 to 6 carbon atoms; and $R_1$ is hydroxy, lower alkoxy, phenyl lower alkoxy, lower alkanoyloxy, benzoyloxy, or acetoacetoxy, which comprises contacting a compound of the formula

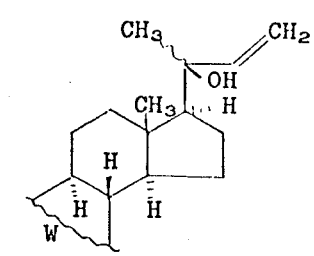

wherein W is as above, with a reagent selected from the group consisting of diketene, lower alkyl acetoacetates and isopropenyl lower alkyl ethers, at an elevated temperature.

20. The process of claim 19 wherein the temperature is between about 150° and about 150°C.

21. The process of claim 19 wherein the reagent is diketene.

22. The process of claim 21 wherein the process is carried out in a medium comprising decalin.

23. The process of claim 21 wherein a basic catalyst is utilized.

24. A process for the preparation of a compound of the formula

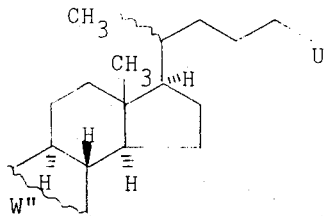

wherein U is -C(CH$_3$)$_2$-OH or -C(CH$_3$)=O and W'' is the partial formula

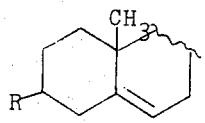

and R is hydroxy, tertiary lower alkoxy, benzyloxy, diphenylmethoxy, trityloxy, lower alkanoyloxy, benzoyloxy, acetoacetoxy, or a group of the formula

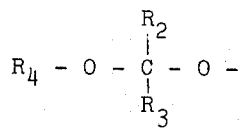

wherein $R_2$ is hydrogen or lower alkyl, $R_3$ and $R_4$ taken independently are each lower alkyl and $R_3$ and $R_4$ taken together are lower alkylene of from 3 to 6 carbon atoms;

which comprises contacting a compound of the formula

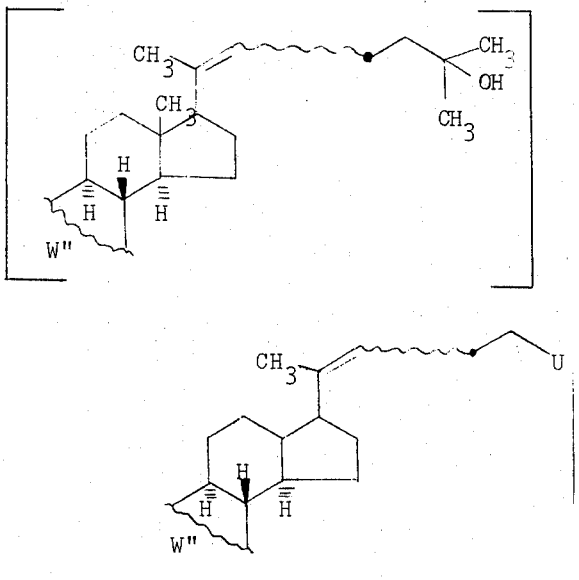

wherein U and W'' are as above, with hydrogen in the presence of a metal hydrogenation catalyst.

25. The process of claim 24 wherein the hydrogenation catalyst is platinum.

26. The process of claim 24 wherein the hydrogenation is conducted in a medium comprising ethanol.

27. The process of claim 24 wherein the temperature is about room temperature.

28. A process for the preparation of a compound of the formula

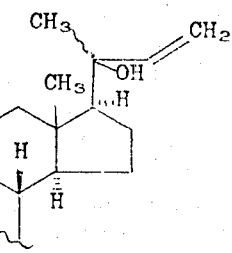

wherein W''' is one of the partial formulas

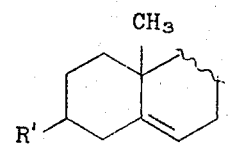 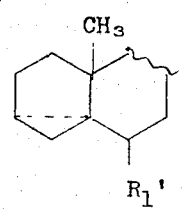

and R' and $R_1$' are each lower alkanoyloxy, benzoyloxy or acetoacetoxy which comprises contacting a compound of the formula

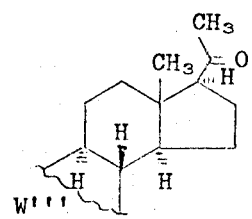

wherein W''' is as above, with a vinyl organometallic reagent in an inert solvent medium comprising a halogenated hydrocarbon at a temperature between about −100°C and 0°C.

29. The process of claim 28 wherein the halogenated hydrocarbon is dichloromethane.

30. The process of claim 28 wherein the temperature is between about −50° and −78°C.

31. The process of claim 28 wherein the vinyl organometallic reagent is vinyl magnesium chloride.

* * * * *

UNITED STATES PATENT OFFICE
CERTIFICATE OF CORRECTION

Patent No. 3,856,780              Dated December 24, 1974

Inventor(s) Thomas Albert Narwid and Milan Radoje Uskokovic

It is certified that error appears in the above-identified patent and that said Letters Patent are hereby corrected as shown below:

The assignment to Hoffmann-La Roche Inc. should be included on the face of the Patent.

Claim 20 should read ---- The process of claim 19 wherein the temperature is between about 150° and about 250°C.----.

Claim 24, column 28, line 65 should read ---- wherein U is $-\underset{\underset{CH_3}{|}}{\overset{\overset{CH_3}{|}}{C}}-OH$ or $-\overset{\overset{CH_3}{|}}{C}=O$ and W" is ----.

Claim 24, column 29, lines 25 to 30 should be deleted, i.e., the brackets and the formula within the brackets should be deleted.

Claim 24, column 29, line 44 should be deleted, i.e., the underline under the formula should be deleted.

*Signed and Sealed this*

Twenty-fourth *Day of* August 1976

[SEAL]

Attest:

RUTH C. MASON
*Attesting Officer*

C. MARSHALL DANN
*Commissioner of Patents and Trademarks*